March 25, 1930.  E. DE STUBNER  1,752,069
SENSITIZED COATING AND METHOD OF MAKING AND APPLYING SAME
AND PHOTOGRAPHIC PLATE OR FILM PRODUCED THEREBY
Filed March 14, 1927
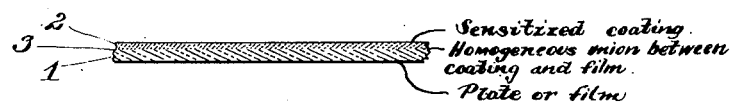
Sensitized coating.
Homogeneous union between coating and film.
Plate or film
INVENTOR.
Emile de Stubner
BY
Rogers, Kennedy Campbell
ATTORNEYS Patented Mar. 25, 1930

1,752,069

UNITED STATES PATENT OFFICE

EMILE DE STUBNER, OF NEW YORK, N. Y.

SENSITIZED COATING AND METHOD OF MAKING AND APPLYING SAME AND PHOTOGRAPHIC PLATE OR FILM PRODUCED THEREBY

Application filed March 14, 1927. Serial No. 175,434.

This invention relates to the manufacture of photographic plates or films, and is concerned more particularly with the application to the plate or film of the sensitized coating, the object of the invention being to apply such coating in a form and simplified manner which will cause it to adhere tenaciously without danger of displacement or removal.

Under the practice now in vogue for coating films of celluloid for instance, an emulsion containing a gelatine and a silver halid is made and is applied to the celluloid film as a sensitized coating, and in order to cause the coating to adhere to the film, which in practice is found to be very difficult, it is necessary to employ a cementing agent such for instance as acetic acid.

In accordance with my invention I form the sensitized coating with a base material or vehicle having an affinity for the material of the film so that the coating may be applied directly to the film without the use of a special cementing agent, and when so applied will, by reason of such affinity, adhere tenaciously thereto without danger of displacement or stripping.

The invention therefore consists of the improved sensitized coating; the method of making such coating; the method of applying the same; and the improved sensitized film or plate resulting therefrom.

In the accompanying drawings:

The figure is a sectional view of a film or plate and a sensitized coating united to it and embodying my invention.

Referring to the drawings:

A celluloid film or plate 1 which has as its basic ingredient nitro-cellulose, has applied to it a sensitized coating 2 which by reason of the characteristic of this sensitized coating, as will be later described, is united homogeneously with the plate as shown at 3 without the intervention of any special or separate cementing medium.

In preparing my improved sensitized coating material for a film of celluloid for instance, which as is well known contains nitrocellulose as its basic ingredient, I place in a tank containing a solution of silver nitrate, a suitable quantity of soluble cellulose ester, such as nitro or acetyl cellulose, and I introduce into the mixture a solution of potassium iodide. As a result of the reaction of the solutions on each other, silver iodide will be precipitated on the cellulose ester, and potassium nitrate will remain in the solution. The cellulose ester now carrying silver iodide as an exceedingly fine precipitate, is washed free from the potassium nitrate and is then dehydrated by a suitable dehydrating agent such as alcohol, whereby there is formed a sensitized soluble cellulose ester damp with alcohol. This sensitized cellulose ester is now dissolved in a suitable solvent to enable it to be applied to the celluloid film as a coating, and for this purpose various solvents may be employed such as butyl-acetate, acetone, glycole ethers, and the like, the effect of which is to convert the cellulose ester into a lacquer containing silver iodide in form of suspension.

The improved sensitized coating material is now complete and ready for application to the celluloid film 1, and it is applied directly thereto so as to form the coating 2 thereon, which application may be accomplished in various ways, for example by spraying the coating material on the film. By reason of the fact that the cellulose ester ingredient of the sensitized coating material possesses an affinity for the nitro-cellulose ingredient of the film, the coating will amalgamate and unite homogeneously with the material of the film as at 3 and will therefore adhere very tenaciously thereto without any danger of the coating peeling or flaking from, or otherwise leaving the film. The sensitized coating being thus directly applied to the film without the employment of any cementing agent to effect the adhesion, greatly simplifies the process, and a character and degree of adhesion is obtained which was not possible under the previous practices.

It will be understood that while I have described the invention as applicable to the coating of films made of celluloid, for which purpose a coating material having soluble cellulose ester as its basic ingredient is employed, the invention is not to be limited in this respect, but in its broader aspects is applicable as well for use in connection with films or plates of other materials, and contemplates the employment of a sensitized coating having a basic ingredient which possesses an affinity for the basic ingredient of the film or plate. It will be manifest therefore that the invention is not limited to any particular material, or in respect to any particular procedure, except in so far as such limitations are specified in the claims; and further it will be understood that the word "film" appearing in the claims is not to be construed in its more limited sense as implying necessarily a flexible support for the sensitized coating material, but is to be taken as including also supports of other kinds, such as plates, and equivalent supports of suitable and appropriate materials.

Having thus described my invention, what I claim is:

1. The process of making photographic films, which consists in applying directly to a film having cellulose ester as its basic ingredient, a sensitized coating material having for its base nitro-cellulose.

2. The process of making a sensitized coating material for photographic films having cellulose ester as the basic ingredient, which consists in precipitating silver iodide on soluble cellulose ester and dissolving the soluble cellulose ester in a suitable solvent.

3. The process of making a sensitized coating material for photographic films having cellulose ester as the basic ingredient, which consists in precipitating silver iodide on nitrocellulose and dissolving the nitro-cellulose in a suitable solvent.

4. In the process of making sensitized coating material for photographic films, precipitating silver iodide on soluble cellulose ester.

5. In the process of making sensitized coating material for photographic films, precipitating silver iodide on nitrocellulose.

6. The process of making a sensitized coating material for photographic films, which consists in precipitating silver iodide on a material possessing an affinity for the material of the film; whereby on the application of said sensitized material to the film, the two will become homogeneously united.

7. The improved sensitized coating for celluloid photographic films consisting of sensitized nitrocellulose in solution.

8. As a new article of manufacture, a sensitized photographic film consisting of a film having cellulose ester as its basic ingredient, and a coating material of sensitized nitrocellulose homogeneously united therewith.

9. The process of making a sensitized coating material for photographic films having cellulose ester as the basic ingredient, which consists in precipitating a silver halide on soluble cellulose ester, and dissolving the soluble cellulose ester in a suitable solvent.

10. The process of making a sensitized coating material for photographic films which consists in precipitating a silver halide on a material possessing an affinity for the material of the film; whereby on the application of such sensitized material to the film, the two will become homogeneously united.

In testimony whereof, I have affixed my signature hereto.

EMILE DE STUBNER.